US007015602B2

(12) United States Patent
Kraus et al.

(10) Patent No.: US 7,015,602 B2
(45) Date of Patent: Mar. 21, 2006

(54) SMALL ELECTRIC APPLIANCE WITH A DRIVE MECHANISM FOR GENERATING AN OSCILLATORY MOTION

(75) Inventors: Bernhard Kraus, Braunfels (DE); Alexander Klos, Hofheim (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 11/078,071

(22) Filed: Mar. 11, 2005

(65) Prior Publication Data

US 2005/0212365 A1 Sep. 29, 2005

Related U.S. Application Data

(63) Continuation of application No. PCT/EP03/09155, filed on Aug. 19, 2003.

(30) Foreign Application Priority Data

Sep. 11, 2002 (DE) ................................ 102 42 092

(51) Int. Cl.
*H02K 33/02* (2006.01)

(52) U.S. Cl. ............................ 310/36; 310/38; 310/47

(58) Field of Classification Search .................. 310/36, 310/47, 38
See application file for complete search history.

(56) References Cited

U.S. PATENT DOCUMENTS

| | | | | |
|---|---|---|---|---|
| 3,296,468 A | | 1/1967 | Townshend | |
| 5,632,087 A | * | 5/1997 | Motohashi et al. | 30/43.92 |
| 5,736,797 A | * | 4/1998 | Motohashi et al. | 310/36 |
| 5,921,134 A | | 7/1999 | Shiba et al. | |
| 6,226,871 B1 | * | 5/2001 | Eichhorn et al. | 30/43.92 |
| 6,933,630 B1 | * | 8/2005 | Kraus et al. | 310/38 |
| 2003/0094861 A1 | * | 5/2003 | Shimizu et al. | 310/36 |
| 2005/0212633 A1 | * | 9/2005 | Kraus et al. | 335/229 |

FOREIGN PATENT DOCUMENTS

| | | |
|---|---|---|
| DE | 265598 | 12/1949 |
| DE | 1 463 988 | 7/1969 |
| EP | 1 193 844 | 3/2004 |
| FR | 2 212 673 | 7/1974 |

* cited by examiner

*Primary Examiner*—Darren Schuberg
*Assistant Examiner*—Erik Preston
(74) *Attorney, Agent, or Firm*—Fish & Richardson P.C.

(57) ABSTRACT

A small electric appliance with a drive mechanism for generating an oscillatory motion of at least one working unit of the small electric appliance. The drive mechanism has a first drive component, a second drive component and a coil for producing a magnetic field that extends from the first drive component and acts on the second drive component that is movably arranged in the small electric appliance, in such a way that the second drive component is set in an oscillatory motion. The first drive component is movably arranged in the small electric appliance in order to execute an oscillatory motion in phase opposition to the second drive component. The mass centers of gravity of the first drive component and the second drive component, including parts co-moving with the first drive component or the second drive component, move on a common straight line.

20 Claims, 4 Drawing Sheets

SMALL ELECTRIC APPLIANCE WITH A DRIVE MECHANISM FOR GENERATING AN OSCILLATORY MOTION

RELATED APPLICATIONS

This application is a continuation of PCT application number PCT/EP03/09155, filed Aug. 19, 2003, which claims priority from German application serial no. 102 42 092.0, filed Sep. 11, 2002. The entire contents of the above PCT application are herein incorporated by reference.

TECHNICAL FIELD

This invention relates to a small electric appliance such as electric shavers or electric toothbrushes.

BACKGROUND

Devices have been developed for creating oscillatory motion in phase opposition in dry shaving apparatus. For example, DE 1 151 307 A describes an oscillating armature drive for dry shaving apparatus with reciprocating working motion. The oscillating armature drive includes a U-shaped electromagnet formed fast with the housing of the shaving apparatus. Arranged in the proximity of the poles of the stationary electromagnet are a working armature and on either side of the working armature in mass symmetry a respective oscillatory compensating armature. In operation, the working armature, which drives the shaving cutter, oscillates parallel to the pole faces of the electromagnet, and the compensating armatures perform an oscillatory motion in phase opposition.

Another example, DE 196 80 506 T1 discloses an electric shaving apparatus having a linear oscillating motor with a stationary electromagnet and several movable components that are set in oscillation in phase opposition to each other by means of the electromagnet. To maintain the mutual phase relationship of the movable components also under load, said components are interconnected by means of a linkage mechanism that transfers the oscillatory motion from the one movable component to the other with simultaneous reversal of direction.

Another example, DE 197 81 664 C2 discloses a linear drive having a hollow cylindrical stator with an electromagnetic coil. Arranged in the stator are two movable elements that are driven in phase opposition to each other, the one element driving a shaving cutter while the other element may have a counterweight to suppress unwelcome vibrations.

SUMMARY

According to one aspect of the invention, a small electric appliance of the present invention includes a drive mechanism for generating an oscillatory motion of at least one working unit. The drive mechanism consists of a first and second drive components movably arranged in the small electric appliance and a coil for producing a magnetic field that extends from the first drive component and engages the second drive component to oscillate. The first drive component oscillates in phase opposition to the second drive component. The mass centers of gravity of the first and the second drive component move on a common straight line., This motion includes any parts co-moving with the first drive component or the second drive component, As the result of the phase opposition in the oscillatory motion of the two drive components, a significantly higher relative speed of the drive components is achieved than with a conventional drive in which only a single drive component moves. As the efficiency of such drives increases with the relative speed of the drive components, higher degrees of efficiency are achieved with the small appliance of the invention than with comparable small appliances known in the art. Furthermore, undesired vibrations may be reduced by restricting the movement of the centers of gravity to a common straight line thereby preventing the drive from producing an angular momentum.

According to the present invention, the small appliance maybe constructed such that the momentums of the first and second drive components a are opposite and equal. This motion includes any parts that may be co-moving with the first or the second drive component,. Furthermore, resulting linear momentum is minimized, thereby minimizing another source of unwelcome vibrations.

In another embodiment, the first and second drive component are in meshing engagement. This enables the drive mechanism to be constructed in a compact manner and still compensate for angular momentums and hence achieving a favorable oscillatory action.

At least one of the two drive components may have one or more permanent magnets. Furthermore, at least one of the two drive components may have a core around which the coil is wound. With this arrangement it is possible, with relatively small dimensions, to obtain a powerful drive whose power consumption is sufficiently low to permit, for example, a battery-powered operation of the small appliance.

Further, at least one elastic element may be provided for producing restoring forces. The result is an oscillatory system that may be operated under resonant conditions. The elastic element may be constructed as a leaf spring that is fastened to the first and to the second drive component. Thus, the leaf spring counteracts a relative displacement of the two drive components, while taking up extremely little space.

Furthermore, the first and second drive component may be mechanically coupled to each other by at least one coupling element. Thus, phase opposition of the oscillatory motions of the two drive components may be achieved. In particular, the coupling element may be rotatably linked to the first second drive component. Depending on the geometry of the drive mechanism, the two drive components also execute a motion which is transverse to the oscillation direction. Therefore, the coupling element is linked to at least one of the drive components with play across the direction of movement of the drive components. Thus, it is possible to establish with the coupling element an opposite-phase relationship between the two drive components by rotatably mounting the coupling element. In one embodiment the coupling element is rotatably mounted on a mounting axle for fastening the drive mechanism to the small appliance. The coupling element is easily fastened at the fulcrum because the fulcrum of the coupling element does not move. Further, the mounting axle may be arranged eccentrically between the linkage points of the coupling element on the first and second drive components. This arrangement allows different oscillation amplitudes without additional gearing. Also the relation between the first and second drive components is maintained unchanged under loading.

Another embodiment is directed to an electric hair cutting appliance. In this embodiment a pair of hair cutting elements includes a set of cutting blades. The hair cutting elements are driven by a a drive mechanism. The drive mechanism comprises two drive components. Each of the drive components carries one of the hair cutting elements. A coil is used to produce a magnetic field that extends between the first and second drive components. This magnetic field acts on the second drive component is set in an oscillatory motion. Further, the first drive component executes an oscillatory motion in phase opposition the said second drive component. While both the first and second drive components execute their respective motion on a common straight line.

The present invention will be explained in the following with reference to the embodiments illustrated in the accompanying drawings. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
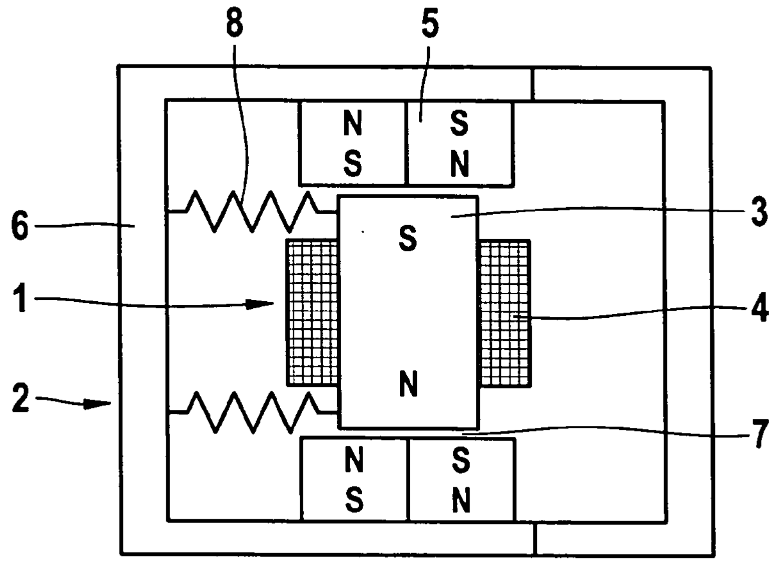
FIG. 1 is a schematic diagram of an embodiment of a linear oscillating motor of the small appliance of the invention.

FIG. 1 is a schematic view of an embodiment of a linear oscillating motor of the small appliance. The linear motor has two movable motor components 1 and 2 that are arranged at a small relative distance to each other. The first motor component 1 is comprised of a bar-shaped iron core 3 and of a wire-wound coil 4. The second motor component 2 has two pairs of permanent magnets 5. The permanent magnets 5 of each pair are arranged side by side with antiparallel polarity on a common carrier plate 6. The carrier plate 6 is made from an iron material and is of a U-shaped configuration. As indicated in FIG. 1, the carrier plate 6 may be optionally constructed as a closed, rectangular frame in order to reduce stray magnetic fields. The following description relates in each case to a U-shaped configuration of the carrier plate 6, it is similarly applicable to a frame construction. The permanent magnets 5 are each fastened to the insides of the two legs of the U-shaped carrier plate 6. Between the opposed pairs of permanent magnets 5, the iron core 3 is arranged such that an air gap 7 is maintained between the two ends of the iron core 3 and the respective adjacent pair of permanent magnets 5. In the proximity of the ends of the iron core 3 two springs 8 are fastened to the iron core's sides, said springs extending parallel to the legs of the carrier plate 6 up to the bottom thereof where they are also fastened. The first motor component 1 and the second motor component 2 are movably suspended to enable them to perform a movement parallel to the legs of the carrier plate 6, that is, a movement in horizontal direction in the representation of FIG. 1. Account being taken of the springs 8, an oscillatory system is thus obtained in which the first motor component 1 and the second motor component 2 perform each a linear oscillating motion. The directions of movement of the two motor components 1 and 2 are opposite to one another, that is, the oscillations are in phase opposition to each other.

The mass centers of gravity of the first motor component 1 and the second motor component 2 move on a common straight line. This means that no angular momentum results from the movement of the two motor components 1 and 2. In order to satisfy the above-named condition for the movement of the mass centers of gravity, he two motor components 1 and 2 in the embodiment illustrated in FIG. 1 are symmetrically constructed in addition to being symmetrically arranged relative to each other. The physical symmetry in the construction and the arrangement of the motor components 1 and 2 is however not an absolute necessity. Furthermore, if the linear momentums of the motor components 1 and 2 occurring within the scope of movement of the two motor components 1 and 2 are opposite and equal at any one time, the linear motor, carried in a suspension as, for example, on the housing of an electric shaver, produces no vibrations.

In FIG. 1 the linear motor is in its position of equilibrium, that is, the springs 8 are neither extended nor compressed. Without the action of external forces the motor components 1 and 2 remain in this position, because for a displacement in horizontal direction it is necessary to overcome restoring forces produced by the springs 8. If, due to the impact of a force, the two motor components 1 and 2 are displaced relative to one another, the restoring forces generated by the springs 8 urge them back into the position of equilibrium. To generate the force necessary for a displacement, an electric current is caused to flow through the coil 4. The coil 4 acts as an electromagnet and, assisted by the iron core 3, produces a magnetic field that acts on the permanent magnets 5 and results in a relative movement of the coil 4 and the permanent magnets 5. In FIG. 1, the relative movement would be in a horizontal direction. Through suitable activation it is possible to reverse the polarity of the magnetic field produced with the coil 4, causing the first and the second motor component 1 and 2 to be set in oscillations of opposite phase. In this context, both the first and the second motor component 1 and 2 move. This design allows for a linear motor without a stator. Essentially, the two counter-oscillating motor components 1 and 2 which drive each other. One of these motor components 1 or 2 corresponds to the rotor of a conventional linear motor. The other motor component performs the functions of the stator of a conventional linear motor. However, unlike a conventional stator it is not static. Among other things this resulting the first and second motor component 1 and 2 of the linear motor of the invention moving at a relative speed that is twice as high as the relative speed of a stator and a rotor of a conventional linear motor.

The frequency of the oscillating movements of the two motor components 1 and 2 is predetermined by the activation of the coil 4. In particular, the frequency is set to the resonant frequency of the oscillatory system formed by the two motor components 1 and 2 and the springs 8. Under resonant conditions there results a highly robust oscillatory action and only comparatively little energy input is required.

Figure 2:
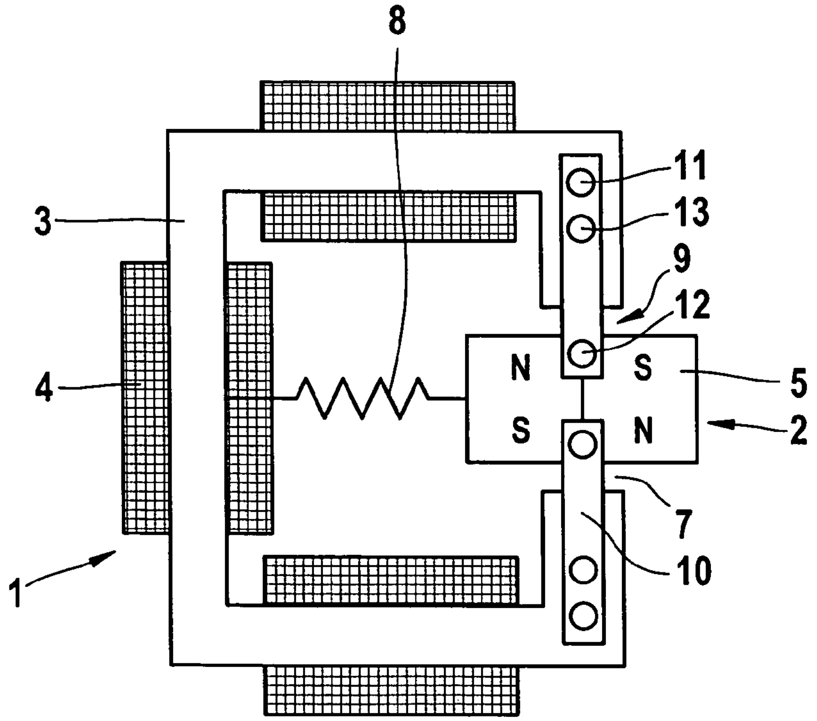
FIG. 2 is a schematic diagram of another embodiment of a linear oscillating motor of the small appliance.

FIG. 2 is a schematic of another embodiment of a linear oscillating motor of the small appliance. In this embodiment, the iron core 3 is constructed as a rectangular frame having an aperture 9 on one side. The three other sides of the frame extend continuously, each carrying a coil 4, so that a total of three coils 4 are provided. Arranged in the aperture 9 is a pair of permanent magnets 5 in antiparallel orientation and of an overall bar-shaped configuration. The permanent magnets 5 being again separated from the iron core 3 by air gaps 7. A spring 8 is held in tension between the side of the iron core 3 opposite the aperture 9 and the permanent magnets 5. Furthermore, the permanent magnets 5 are mechanically coupled to the iron core 3 by means of two struts 10 spanning the respective air gaps 7. For this purpose, each strut 10 has a first bore 11 and a second bore 12 linking it rotatably to the iron core 3 and to the permanent magnets 5. Further, each strut 10 has in the area between the first bore 11 and the second bore 12 a third bore 13 for fastening the linear motor as on a housing not illustrated in the FIG. 2. Apart from serving this fastening function, the struts 10 are also used for coupling the movements of the two motor components 1 and 2. This coupling has the effect of causing the two motor components 1 and 2 to move in exact phase opposition to each other at any one time, because the motor is fastened in the space between the linkage to the first motor component 1 and the linkage to the second motor component 2. In other words, when in the representation of FIG. 2 the first motor component 1 moves to the left, the second motor component 2 moves simultaneously to the right, and vice versa. Since in this movement the distance between the linkage points on the two motor components 1 and 2 varies slightly, the bores 11 and 12 are elongated holes so that linkage is effected with some play.

In the embodiment shown, rather than being centrally placed between the bores 11 and 12, the third bore 13, is located closer to the first bore 11 used for linkage on the iron core 3 of the first motor component 1. In consequence, the two motor components 1 and 2 oscillate with different oscillation amplitudes. As depicted, the first motor component 1 has a smaller oscillation amplitude than the second motor component 2. The speeds at which the two motor components 1 and 2 move are in a correspondingly inverse ratio to each other. In order to enable the linear momentums of the two motor components 1 and 2 to adopt opposite and equal values also in this embodiment, the first motor component 1 is designed such that its mass exceeds the mass of the second motor component 2. This geometry may be used, for example, on an electric shaver in which one or several shaving cutters are to execute rapid oscillatory motions of large amplitude while a shaving head is to oscillate in phase opposition thereto with a small amplitude. To this effect, the shaving cutter or cutters are driven by the second motor component 2 and the shaving head by the first motor component 1.

Figure 3:
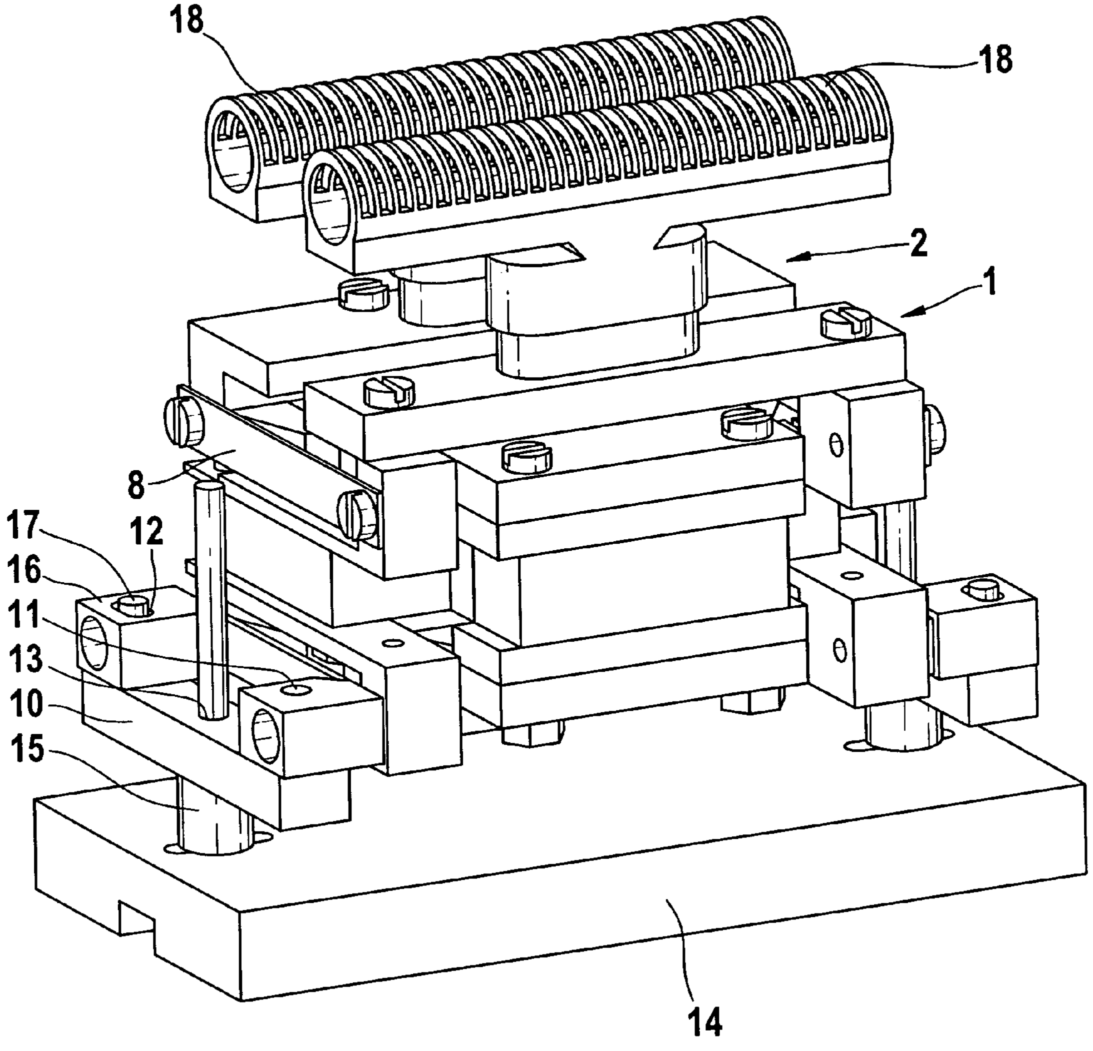
FIG. 3 is a perspective view of an embodiment of a linear oscillating motor of an electric shaver.
Figure 5:
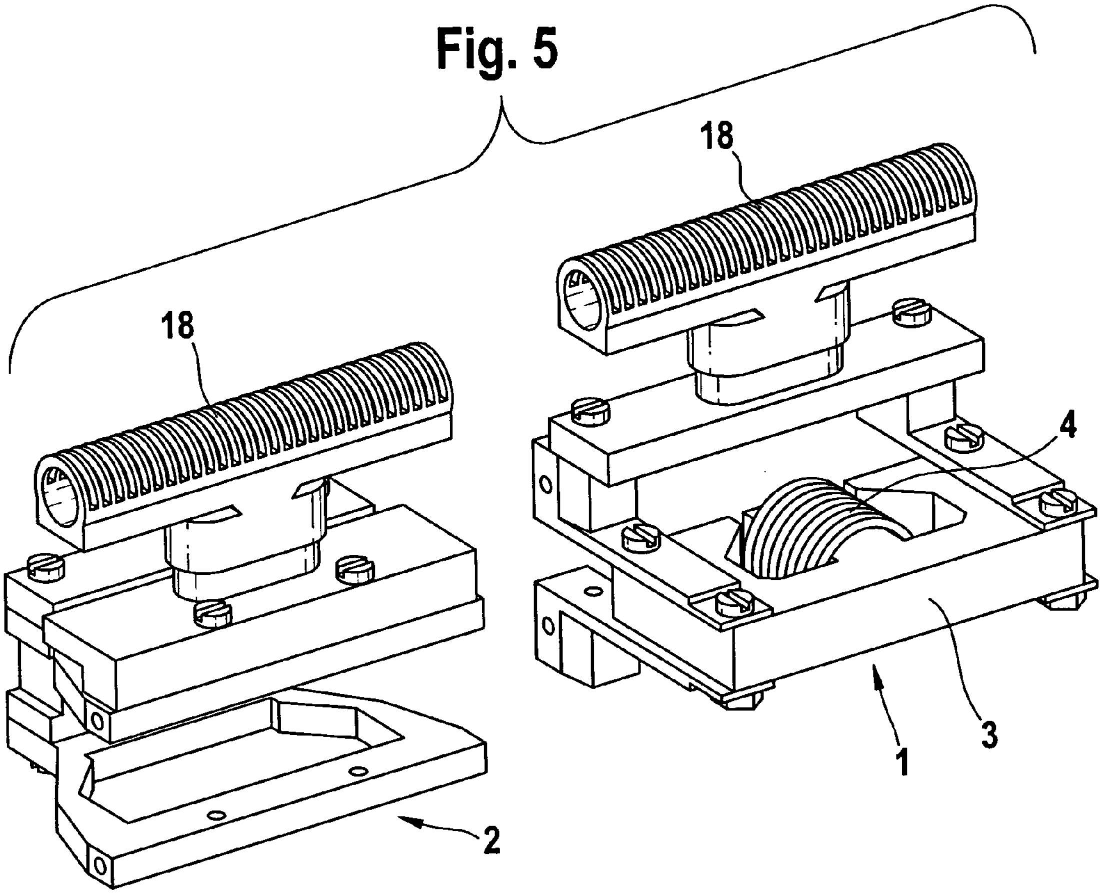
FIG. 5 is a perspective view of the two movable motor components of the linear motor of FIG. 3, showing them as separate units.

FIG. 3 shows a perspective view of one embodiment of a linear oscillating motor in. A related exploded view is shown in FIG. 5. Apart from the linear motor itself, only a few components of the shaver are illustrated, which are directly coupled to the linear motor. For enhanced clarity of the illustration, the shaving head has been omitted from the illustration. Otherwise the shaver may be constructed in the conventional manner. For the description, the same reference numerals are applied to corresponding parts as those used in FIG. 2, with the concrete construction of the parts and also of the complete linear motor differing in some aspects from FIG. 2 significantly.

The linear motor is mounted on a base plate 14 which is fixed to a shaver housing not shown in the Figure. Received within the base plate 14 are two stepped studs 15 which are guided through the third bores 13 in the struts 10. The two motor components 1 and 2 are rotatably linked to the struts 10 by means of four bearing blocks 16 through which bores extend. Each strut 10 has two trunnions 17 receiving the bearing blocks 16, allowance being made for some clearance between the trunnions 17 and the bores 11 or 12 of the bearing blocks 16. One bearing block is secured to the first motor component 1 and the other bearing blocks is secured to the second motor component 2. By virtue of this arrangement the two motor components 1 and 2 are suspended so as to be able to move within certain limits in a direction parallel to the longitudinal side of the base plate 14. The two motor components 1 and 2 are connected with each other by means of a total of four springs 8 which constructed as leaf springs and produce restoring forces when a displacement from the illustrated position of equilibrium occurs. Fixedly connected with the first motor component 1 and the second motor component 2 is a respective shaving cutter 18 so that the two shaving cutters 18 are driven in phase opposition to one another. The embodiment of the linear motor shown includes as further components the iron core 3 with the coil 4 and the permanent magnets 5 as well as a number of other components which are of no particular interest within the scope of the present invention and therefore are not discussed in greater detail.

Figure 4:
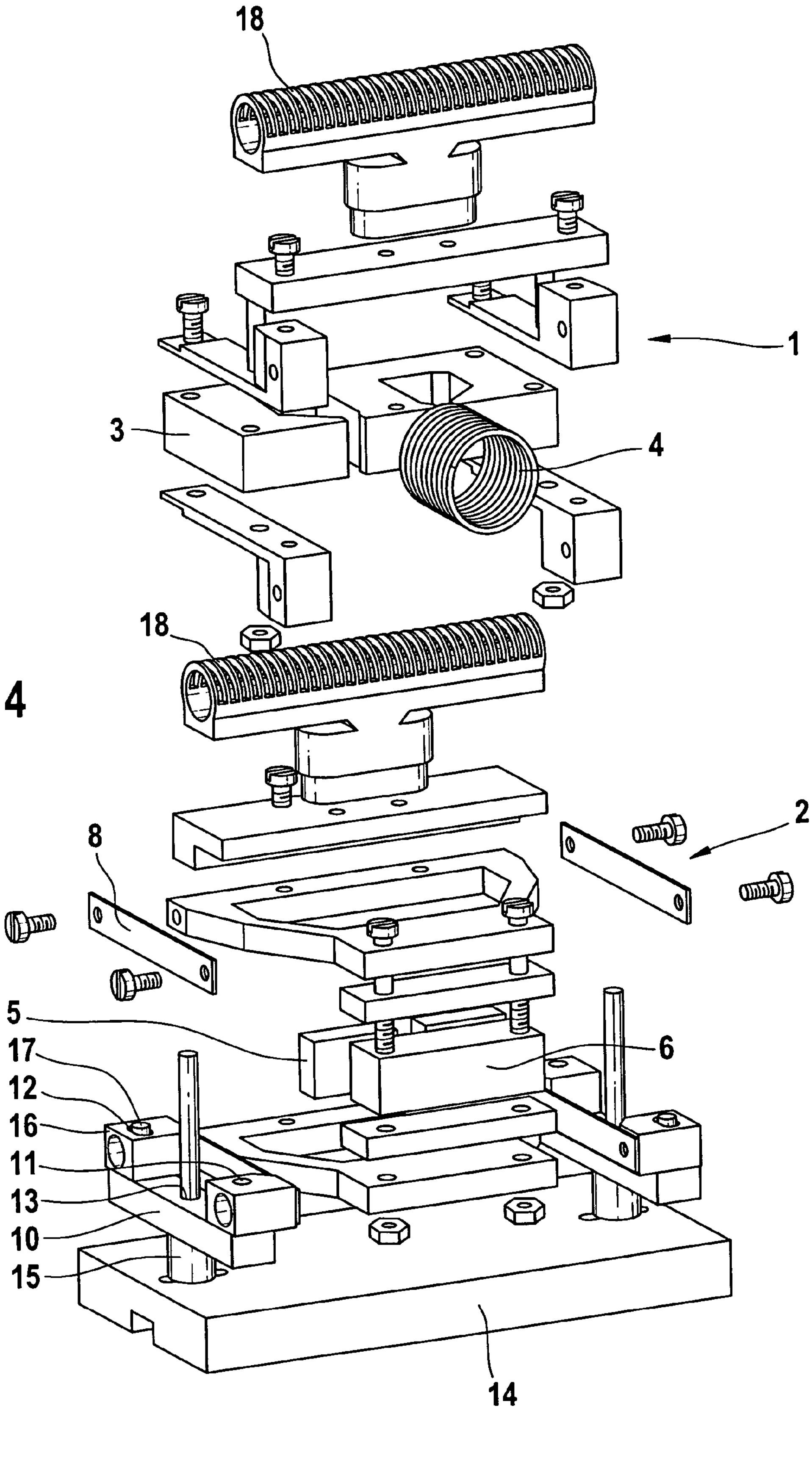
FIG. 4 is an exploded perspective view of the embodiment of FIG. 3.
Figure 6:
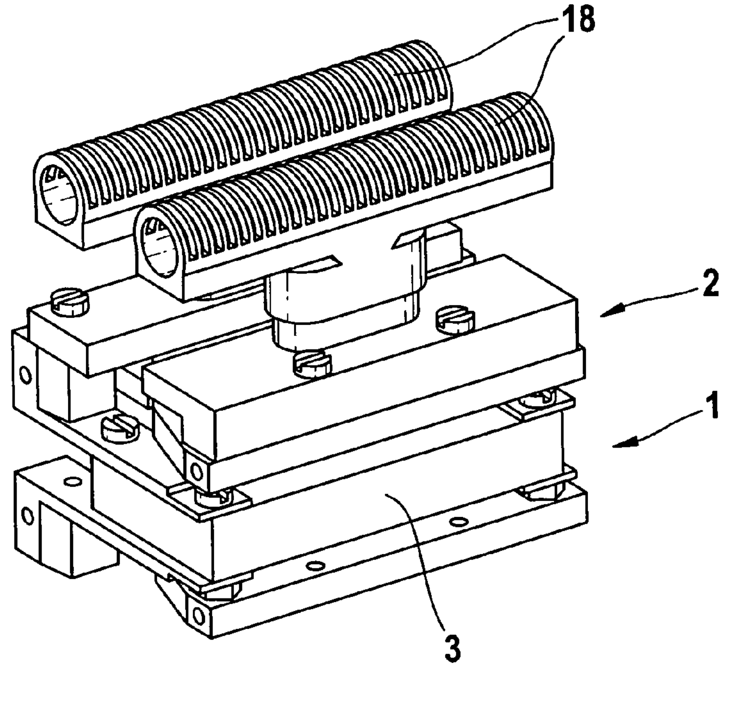
FIG. 6 is a perspective view of the two motor components of FIG. 5 in assembled condition.

FIG. 5 shows the two motor components 1 and 2 of the linear motor of FIG. 3 as separate units in a perspective representation. In FIG. 6 the two motor components 1 and 2 are shown in assembled condition. When comparing them with FIGS. 3 and 4 it should be considered that FIGS. 5 and 6 are rear views for illustrating further details, i.e., the object shown is rotated through 180° about a vertical axis.

As becomes apparent from FIGS. 5 and 6, the two motor components 1 and 2 are designed for meshing engagement. This makes it possible for the linear motor to be of a highly compact construction while yet compensating for the above-mentioned angular momentums, i.e., distributing the masses of the two motor components 1 and 2 in such manner that their mass centers of gravity move on a common straight line. In this context, it is possible to make allowance for the masses of the shaving cutters 18 driven by the two motor components 1 and 2 and, as the case may be, of a driven shaving head. In the embodiment shown, the motor is suspended on the studs 15 at a location centrally between the linkage points on the first motor component 1 and on the second motor component 2. Hence, the two motor components 1 and 2 move with the same amplitude and, in terms of amount, at the same speed. By counterbalancing the masses of the two motor components 1 and 2 inclusive of co-moving parts, it is also possible to compensate for the linear momentums, which enables a low-vibration shaver to be obtained.

A number of embodiments of the invention have been described. Nevertheless, it will be understood that various modifications may be made without departing from the spirit and scope of the invention. Accordingly, other embodiments are within the scope of the following claims.

What is claimed is:

1. A small electric appliance with a drive mechanism for generating an oscillatory motion, said drive mechanism comprising:

a first drive component movably arranged in said small electric appliance;

a second drive component movably arranged in said small electric appliance; and wherein one of said first and second drive components includes a coil adapted to produce a magnetic field that extends from said first drive component and acts on said second drive component, in such a way that said second drive component is set in an oscillatory motion, said coil moving in conjunction with one of said first and second drive components;

wherein said first drive component executes an oscillatory motion in phase opposition to said second drive component, in which mass centers of gravity of said first and second drive components, including co-moving components of said first and second drive components, move on a common straight line.

2. The small electric appliance of claim 1 wherein momentums of said first and second drive components are equal and opposite.

3. The small electric appliance of claim 1 wherein said first and second drive components are meshingly engaged.

4. The small electric appliance of claim 1 further including at least one permanent magnet attached to at least one of said first and second drive components drive components.

5. The small electric appliance of claim 1 further including a core attached to at least one of said two drive components, wherein said coil is wound around said core.

6. The small electric appliance of claim 1 further including at least one elastic element fastened to said first drive component and to said second drive component.

7. The small electric appliance of claim 6 wherein said elastic element is a leaf spring.

8. The small electric appliance of claim 1 further including a coupling element linked to said first drive component and to said second drive component.

9. The small electric appliance as claimed in claim 8 wherein said coupling element is rotatably linked to said first drive component and to said second drive component.

10. The small electric appliance as in claim 8 wherein said coupling element is linked to at least one of the drive components with play across the direction of movement of the drive components.

11. The small electric appliance as in claim 8 wherein said coupling element is rotatably mounted to said small electric appliance.

12. The small electric appliance as in claims 11 wherein said coupling element is rotatably mounted eccentrically between said first drive component and said second drive component.

13. The small electric appliance of claim 1 wherein said co-moving components further comprise hair cutters secured to each of the first and second drive components.

14. An electric hair cutting appliance comprising:

a pair of hair cutting elements, each hair cutting element including a set of cutting blades; and a drive mechanism operably connecting a motor to driving the hair cutting elements, the drive mechanism comprising;

a first and second drive components, each drive component carrying a respective one of the hair cutting elements; and wherein one of the first and second drive components includes a coil adapted to produce a magnetic field that extends from said first drive component and acts on said second drive component, in such a way that said second drive component is set in an oscillatory motion, said coil moving in conjunction with one of said first and second drive components;

wherein said first drive component executes an oscillatory motion in phase opposition to said second drive component, in which mass centers of gravity of said first and second drive components, including co-moving components of said first and second drive components, move on a common straight line.

15. The small electric appliance of claim 14 wherein momentums of said first and second drive components are equal and opposite.

16. The small electric appliance of claim 14 wherein said first and second drive components are meshingly engaged.

17. The small electric appliance of claim 14 further including at least one permanent magnet attached to at least one of said two drive components.

18. The small electric appliance of claim 14 further including a core attached to at least one of said two drive components, wherein said coil is wound around said core.

19. The small electric appliance of claim 14 further including at least one elastic element fastened to said first drive component and to said second drive component.

20. The small electric appliance of claim 19 wherein said elastic element is a leaf spring.

* * * * *